US011507415B2

(12) United States Patent
Mohan Thampi et al.

(10) Patent No.: US 11,507,415 B2
(45) Date of Patent: Nov. 22, 2022

(54) SUPPORTING INVOCATIONS OF THE RDTSC (READ TIME-STAMP COUNTER) INSTRUCTION BY GUEST CODE WITHIN A SECURE HARDWARE ENCLAVE

(71) Applicant: VMWARE, INC., Palo Alto, CA (US)

(72) Inventors: Vivek Mohan Thampi, Bangalore (IN); Alok Nemchand Kataria, Pune (IN); Martim Carbone, Palo Alto, CA (US); Deep Shah, Palo Alto, CA (US)

(73) Assignee: VMWARE, INC., Palo Alto, CA (US)

( * ) Notice: Subject to any disclaimer, the term of this patent is extended or adjusted under 35 U.S.C. 154(b) by 322 days.

(21) Appl. No.: 16/822,054

(22) Filed: Mar. 18, 2020

(65) Prior Publication Data
US 2021/0216357 A1 Jul. 15, 2021

(30) Foreign Application Priority Data
Jan. 14, 2020 (IN) .............................. 202041001650

(51) Int. Cl.
G06F 9/48 (2006.01)
G06F 9/455 (2018.01)
(Continued)

(52) U.S. Cl.
CPC ........ *G06F 9/4825* (2013.01); *G06F 9/45545* (2013.01); *G06F 9/45558* (2013.01);
(Continued)

(58) Field of Classification Search
CPC .............. G06F 9/4825; G06F 9/45545; G06F 9/45558; G06F 21/53; G06F 21/6281;
(Continued)

(56) References Cited

U.S. PATENT DOCUMENTS

2006/0259818 A1* 11/2006 Howell ............... G06F 11/1484
714/21
2007/0033589 A1* 2/2007 Nicholas ............. G06F 9/45533
718/1

(Continued)

OTHER PUBLICATIONS

"Timestamp-counter Scaling for Virtualization White Paper." Reference No. 333159-001. Available Sep. 2015 (Year: 2015).*

*Primary Examiner* — Michael W Ayers

(57) ABSTRACT

Techniques for supporting invocations of the RDTSC (Read Time-Stamp Counter) instruction, or equivalents thereof, by guest program code running within a virtual machine (VM), including guest program code running within a secure hardware enclave of the VM, are provided. In one set of embodiments, a hypervisor can activate time virtualization heuristics for the VM, where the time virtualization heuristics cause accelerated delivery of system clock timer interrupts to a guest operating system (OS) of the VM. The hypervisor can further determine a scaling factor to be applied to timestamps generated by one or more physical CPUs, where the timestamps are generated in response to invocations of a CPU instruction made by guest program code running within the VM, and where the scaling factor is based on the activated time virtualization heuristics. The hypervisor can then program the scaling factor into the one or more physical CPUs.

18 Claims, 4 Drawing Sheets

(51) Int. Cl.
*G06F 21/62* (2013.01)
*G06F 21/53* (2013.01)

(52) U.S. Cl.
CPC .......... *G06F 21/53* (2013.01); *G06F 21/6281* (2013.01); *G06F 2009/4557* (2013.01); *G06F 2009/45591* (2013.01); *G06F 2221/2151* (2013.01)

(58) Field of Classification Search
CPC ... G06F 2009/4557; G06F 2009/45591; G06F 2221/2151
See application file for complete search history.

(56) References Cited

U.S. PATENT DOCUMENTS

| | | | |
|---|---|---|---|
| 2010/0250230 A1* | 9/2010 | Ganguly | G06F 9/45558 713/178 |
| 2013/0219389 A1* | 8/2013 | Serebrin | G06F 9/45558 718/1 |
| 2015/0277989 A1* | 10/2015 | Laborde | G06F 9/52 718/107 |
| 2017/0185436 A1* | 6/2017 | Deng | G06F 9/45558 |
| 2019/0056972 A1* | 2/2019 | Zhou | G06F 11/30 |
| 2019/0087215 A1* | 3/2019 | Bhandari | G06F 9/45558 |
| 2021/0019393 A1* | 1/2021 | Michalevsky | G06F 21/575 |

* cited by examiner

SUPPORTING INVOCATIONS OF THE RDTSC (READ TIME-STAMP COUNTER) INSTRUCTION BY GUEST CODE WITHIN A SECURE HARDWARE ENCLAVE

RELATED APPLICATIONS

Benefit is claimed under 35 U.S.C. 119(a)-(d) to Foreign Application Serial No. 202041001650 filed in India entitled "SUPPORTING INVOCATIONS OF THE RDTSC (READ TIME-STAMP COUNTER) INSTRUCTION BY GUEST CODE WITHIN A SECURE HARDWARE ENCLAVE", on Jan. 14, 2020, by VMware, Inc., which is herein incorporated in its entirety by reference for all purposes.

BACKGROUND

There are several ways in which guest program code running within a virtual machine (VM) can keep track of the VM's system time (i.e., the amount of real-world time that has elapsed from the point of powering-on the VM). One method is to employ a programmable interval timer, known as a system clock timer, that causes interrupts to be generated on a periodic basis which are delivered to the VM's guest operating system (OS). Upon receiving such an interrupt, the guest OS increments a counter value (i.e., system clock counter) that indicates the VM's system time, and this system clock counter can be queried by other guest code via an appropriate guest OS Application programming interface (API). For example, if the system clock timer is programmed to generate an interrupt every 10 milliseconds (ms) and the system clock counter has a value of 1000, that means a total of 10×1000=10,000 ms (or 10 seconds) have passed since the time of VM power-on.

Another way in which guest code can track/determine VM system time is to employ the RDTSC (Read Time-Stamp Counter) instruction that is implemented by Central processing units (CPUs) based on the x86 CPU architecture. When guest code calls the RDTSC instruction, the physical CPU mapped to the VM's virtual CPU (vCPU) writes a hardware-derived timestamp value (referred to herein as an RDTSC timestamp) into two vCPU registers. This RDTSC timestamp indicates the number of physical CPU clock cycles, or ticks, that have occurred since the time of host system power-on/reset (subject to an offset specified by the host system's hypervisor to account for the time at which the VM was powered-on). Thus, this timestamp can be considered reflective of the amount of real-world time that has transpired during that period. The guest code that invoked the RDTSC instruction can then retrieve the RDTSC timestamp from the appropriate vCPU registers and thereby determine the current VM system time.

To account for scenarios in which the physical compute resources of a host system become overcommitted (i.e., scenarios where the number of running vCPUs exceed the number of available physical CPUs), some existing hypervisors implement a time virtualization heuristics module that uses heuristics to intelligently accelerate the delivery of system clock timer interrupts to VMs which have been de-scheduled and subsequently re-scheduled on the host system's physical CPU(s) due to CPU starvation/contention. This accelerated interrupt delivery ensures that the system time of such VMs (as determined via their system clock counters) eventually catches up to real-world time.

In addition, hardware virtualization technologies such as Intel VT and AMD-V provide the capability to intercept RDTSC instructions invoked by VMs. When time virtualization heuristcs are active, existing hypervisors make use of this capability to (1) trap an RDTSC instruction call made by VM guest code, (2) emulate execution of the RDTSC instruction (i.e., generating a RDTSC timestamp in software rather than via the CPU hardware), and (3) provide the software-generated RDTSC timestamp to the calling guest code. This RDTSC trapping and emulation mechanism allows the hypervisor to provide an RDTSC timestamp to the calling guest code that is consistent with the hypervisor-level time virtualization heuristics applied to the VM's system clock timer interrupts, and thus ensures that the VM as a whole has a coherent view of its system time from both clock sources.

However, a significant complication with the foregoing is that the RDTSC instruction may be invoked by guest code running within a secure hardware enclave of the VM. In these cases, the hypervisor cannot provide an emulated RDTSC timestamp to the calling guest code because the state of that guest code is isolated from, and thus cannot be modified by, the hypervisor. As a result, the hypervisor cannot ensure that the RDTSC timestamps received by the secure hardware enclave guest code will be consistent with time virtualization heuristics applied to the VM's system clock timer interrupts.

DETAILED DESCRIPTION

In the following description, for purposes of explanation, numerous examples and details are set forth in order to provide an understanding of various embodiments. It will be evident, however, to one skilled in the art that certain embodiments can be practiced without some of these details, or can be practiced with modifications or equivalents thereof.

1. Overview

Embodiments of the present disclosure are directed to techniques that may be implemented by a hypervisor of a host system for supporting invocations of the RDTSC instruction (or equivalents thereof) by guest program code running within a secure hardware enclave of a VM. As used herein, a secure hardware enclave (also known as a hardware-assisted trusted execution environment or TEE) is a region of computer system memory, allocated via a special set of CPU instructions, where user-world code can run in a manner that is isolated from other processes running in other memory regions (including those running at higher privilege levels, such as a VM's guest OS or the hypervisor). Thus, secure hardware enclaves enable secure and confidential computation. Examples of existing technologies that facilitate the creation and use of secure hardware enclaves include SGX (Software Guard Extensions) for Intel CPUs and TrustZone for ARM CPUs.

At a high level, the techniques of the present disclosure guarantee that invocations of the RDTSC instruction made by guest code within a VM's secure hardware enclave do not result in a conflict between (1) the guest code's understanding of VM system time as determined using the RDTSC instruction, and (2) the guest code's understanding of VM system time as determined using the VM's system clock timer/counter, which may be manipulated by the hypervisor via time virtualization heuristics. These and other aspects are described in further detail in the sections that follow.

2. Example Host System

Figure 1:
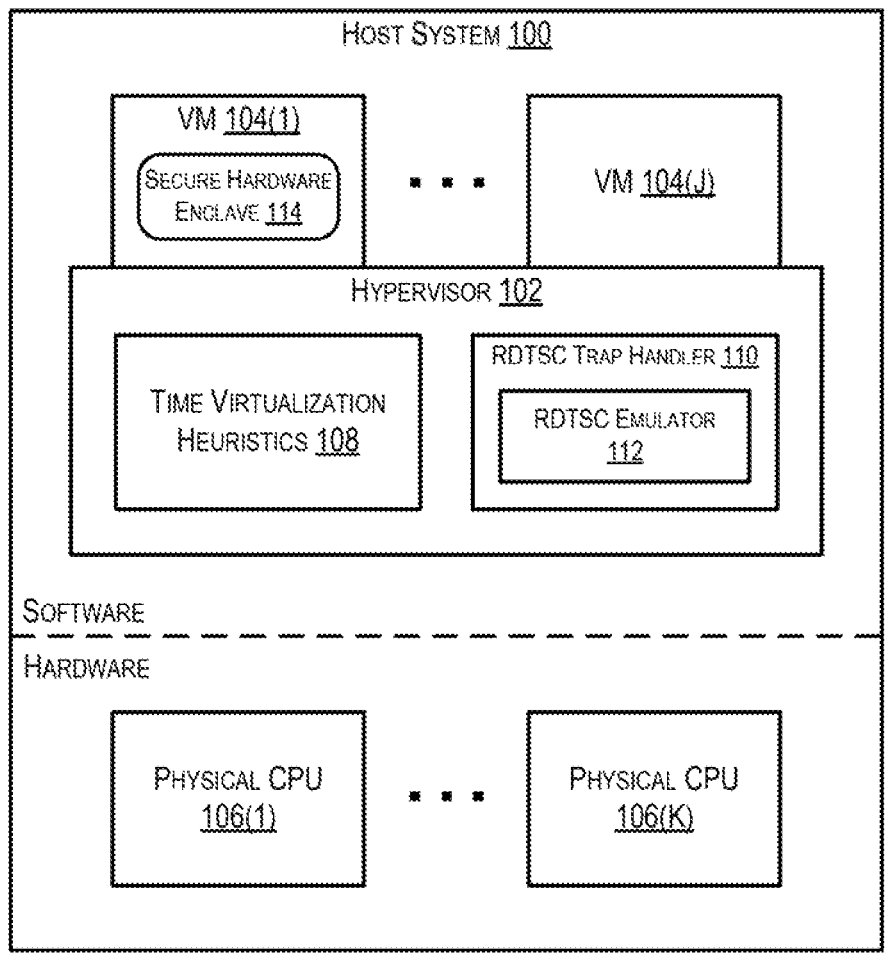
FIG. 1 depicts a host system in accordance with certain embodiments.

FIG. 1 is a simplified block diagram of a host system 100 in which embodiments of the present disclosure may be implemented. As shown, host system 100 includes a software layer comprising a hypervisor 102 and a number of VMs 104(1)-(J) and a hardware layer comprising a number of physical CPUs 106(1)-(K). In various embodiments, hypervisor 102 can virtualize the hardware resources of host system 100, including physical CPUs 106(1)-(K), and allocate these virtualized hardware resources to VMs 104(1)-(J) so that the VMs can carry out guest application workloads.

As mentioned previously, there are two different types of timekeeping systems which guest program code running within VMs 104(1)-(J) can rely on in order to track/determine the system time of their respective VMs. The first type of timekeeping system uses a VM-level system clock counter which is incremented based on interrupts that are delivered in accordance with a programmable system clock timer. The second type of timekeeping system uses the RDTSC CPU instruction which is supported by x86 CPUs (and is assumed to be supported by physical CPUs 106(1)-(K)).

In a virtualized host system like system 100 of FIG. 1, it is fairly common for the host system's physical CPUs to become temporarily overcommitted. In scenarios where the host system's VMs use the first type of time keeping system noted above (i.e., a system based on system clock timer interrupts), CPU overcommitment problems can prevent system clock timer interrupts from being delivered to a VM's guest OS in a timely fashion. This, in turn, can cause inconsistencies in the guest OS's understanding of VM system time. To understand this, consider a scenario in which the system clock timer of VM 104(1) is programmed to generate an interrupt every 10 ms and the vCPU of VM 104(1) is placed (i.e., scheduled) on physical CPU 106(1) for execution. Assume that the vCPU runs for 50 ms on physical CPU 106(1), resulting in the delivery of 5 interrupts (one every 10 ms) to the guest OS of VM 104(1) and an increase in the VM's system clock counter to 5. Further assume that after those 50 ms of runtime, the vCPU of VM 104(1) is de-scheduled from physical CPU 106(1) and placed in a "waiting" state for the next 30 ms because the vCPU of another VM needs to run on physical CPU 106(1) (and there are no other physical CPUs available). After the 30 ms have elapsed, assume that the vCPU of VM 104(1) is re-scheduled on physical CPU 106(1) (or another available physical CPU of host system 100) and resumes its execution.

In the foregoing scenario, the guest OS of VM 104(1) cannot receive any interrupts during the 30 ms timeframe in which the VM's vCPU is de-scheduled and in the waiting state because the VM's vCPU is not actually running during that period. Thus, the guest OS will receive its sixth interrupt at the real-world time of 50 ms (initial operation)+30 ms (waiting state)+10 ms (timer interval)=90 ms. However, because the guest OS has only received 6 interrupts, the guest OS will erroneously believe that the correct VM system time at that point is 60 ms (i.e., 6 interrupts×10 ms per interrupt). In addition, as long as the guest OS continues receiving further interrupts at the programmed interval of 10 ms from that point onward, the guest OS's notion of VM system time (per the system clock counter) will perpetually lag behind real-world time by 30 ms.

To address this issue, certain existing hypervisors implement a time virtualization heuristics module (shown as module 108 in FIG. 1) that is designed to detect these types of CPU overcommitment scenarios and accelerate the delivery of system clock timer interrupts to the guest OSs of "lagging" VMs like VM 104(1). Through this accelerated interrupt delivery, module 108 can enable a lagging VM's system clock counter to eventually catch up—or in other words, reach consistency—with real-world time. Once this catch up is achieved, time virtualization heuristics module 108 can be deactivated for that VM until the module determines that the catch-up heuristics are needed again (e.g., the VM misses further interrupts due to its vCPU being de-scheduled and re-scheduled in the future).

For example, with respect to VM 104(1) discussed above, at the time the VM's vCPU is re-scheduled on physical CPU 106(1) after 30 ms in the waiting state, time virtualization heuristics module 108 can detect that the VM's guest OS has effectively missed three interrupts (one interrupt per 10 ms) after the fifth one and thus apply catch-up heuristics that cause the next six interrupts (i.e., the sixth, seventh, eighth, ninth, tenth, and eleventh interrupts) to be delivered to the guest OS at an accelerated pace of every 5 ms, rather than at the programmed pace of every 10 ms. The delivery times of interrupts 6-10 at this accelerated pace is presented in the table below in terms of real-world time and is contrasted against the delivery times for these interrupts that would occur at the normal programmed pace:

TABLE 1

| Interrupt number | Time of delivery (in real-world time) at accelerated pace of 5 ms intervals | Time of delivery (in real-world time) at programmed pace of 10 ms intervals |
| --- | --- | --- |
| Sixth | 85 ms | 90 ms |
| Seventh | 90 ms | 100 ms |
| Eighth | 95 ms | 110 ms |
| Ninth | 100 ms | 120 ms |
| Tenth | 105 ms | 130 ms |
| Eleventh | 110 ms | 140 ms |

As can be seen in the second table column above, once the eleventh interrupt has been delivered to the guest OS of VM 104(1) at the accelerated pace of 5 ms intervals, the VM's notion of its system time per the system clock counter (i.e., 11 interrupts×10 ms per interrupt=110 ms) will have caught up with the real-world time of 110 ms. Thus, time virtualization heuristics module 108 has brought the VM's system time in alignment with real-world time, and module 108 can be deactivated at that point for VM 104(1) (i.e., future interrupts can be delivered to the VM's guest OS at the normal programmed pace of 10 ms) until needed again. If no catch-up heuristics were applied to VM 104(1), the VM's system time would lag behind real-world time by 30 ms at every interrupt point as shown in the third column of Table 1.

One consequence of implementing time virtualization heuristics module 108 is that the RDTSC instruction may return timestamp values that conflict (or in other words, are out of sync) with the system clock counter of a VM when module 108 is enabled/active with respect to that VM. This is problematic because some guest OSs leverage the RDTSC instruction in combination with the system clock counter for higher resolution system time readings. For example, because the frequency at which system clock timer interrupts are generated is relatively low (e.g., every 10 ms), a guest OS can determine a more accurate time reading by calculating (time from system clock counter)+RDTSC time elapsed since the last system clock timer interrupt. Thus, it is desirable to ensure that the VM's system clock counter remains in sync with the RDTSC timestamps returned by the RDTSC instruction when time virtualization heuristics are active.

The foregoing is currently achieved via a hypervisor-level RDTSC trap handler and corresponding RDTSC emulator (shown via reference numerals 110 and 112 in FIG. 1). Generally speaking, when time virtualization heuristics module 108 enables catch-up heuristics for a given VM 104, module 108 also enables a trap bit that causes all calls to the RDTSC instruction by guest code within the VM to be trapped by (or in other words, cause an exit to) hypervisor 102. This is in contrast to the normal sequence of operation in which a guest call to the RDTSC instruction causes the instruction to be directly passed to and handled by a physical CPU 106, without involvement by hypervisor 102.

When the trap/exit to hypervisor 102 occurs, the hypervisor 102 passes control to RDTSC trap handler 110, which in turn uses RDTSC emulator 112 to emulate the invoked RDTSC instruction in software and thereby generate a RDTSC timestamp that takes into account the current state of time virtualization heuristics module 108 with respect to the subject VM. RDTSC trap handler 110 then writes the emulated RDTSC timestamp to one or more vCPU registers of the VM and control returns to the calling guest code, which retrieves the emulated RDTSC timestamp from the vCPU register(s) and continues with its execution. Finally, once the catch-up heuristics applied via time virtualization heuristics module 108 have enabled the VM's system clock counter to catch up with real-world time, module 108 unsets the trap bit. This causes further RDTSC instruction calls from within the VM to be once again handled directly by a physical CPU 106 in accordance with the normal mode of operation.

For instance, in the previously discussed example of VM 104(1), assume guest code within the VM calls the RDTSC instruction at the time of delivery of the seventh interrupt (i.e., at the real-world time of 90 ms). If the RDTSC instruction were passed directly through to a physical CPU 106, the physical CPU would return a hardware derived RDTSC timestamp reflecting the real-world time of 90 ms. However, that would be undesirable because the guest OS of VM 104(1) has only received seven interrupts at that point, and thus the guest OS believes the total elapsed time is 70 ms per its system clock counter. Thus, in this scenario RDTSC trap handler 110/emulator 112 can recognize that the VM's system clock counter indicates a system time of 70 ms (in accordance with the currently applied heuristics) and return a consistent RDTSC timestamp of 70 ms to the calling guest code.

As noted in the Background section, a significant complication with performing hypervisor-level trapping and emulation of the RDTSC instruction is that, in some cases, this instruction may be called by guest code running within a secure hardware enclave of a VM. An example of such a secure hardware enclave is shown via reference numeral 114 within VM 104(1) of FIG. 1. In these cases, the state of the guest code within the secure hardware enclave will be opaque/inaccessible to hypervisor 102. As a result, it is not possible for RDTSC trap handler 110 to provide an emulated RDTSC timestamp to the calling guest code, because handler 110 cannot write the timestamp to the VM's vCPU register(s) in a manner that is visible within the enclave.

To address this and other similar problems, in various embodiments time virtualization heuristics module 108 and/or RDTSC trap handler 110 can be enhanced in a manner that guarantees RDTSC invocations made by guest code within a VM's secure hardware enclave return RDTSC timestamps that are always consistent with the VM's system clock counter. For example, in one set of embodiments (referred to herein as the TSC scaling approach and detailed in section (3) below), components 108 and/or 110 can be modified to leverage the TSC (Time-Stamp Counter) scaling feature available on many modern x86 CPU designs to modify, via physical CPUs 106(1)-(K), the hardware-derived RDTSC timestamps that are returned to secure hardware enclave guest code in accordance with module 108's time virtualization heuristics (rather than performing this modification in software via RDTSC emulator 112). In certain embodiments, this TSC scaling approach can completely avoid the need for hypervisor 102 to explicitly trap and emulate RDTSC instruction calls made from within a VM's secure hardware enclave (or more generally, from anywhere within the VM) in order to achieve consistency with the accelerated interrupt delivery performed by time virtualization heuristics module 108.

In another set of embodiments (referred to herein as the heuristics suppression approach and detailed in section (4) below), components 108 and/or 110 can be modified to (1) deactivate the time virtualization heuristics applied to a given VM when an invocation of the RDTSC instruction by guest code within a secure hardware enclave of that VM is trapped by hypervisor 102 (thereby effectively dropping the interrupts that would have otherwise been delviered to the VM if the VM was not de-scheduled), (2) move forward the VM's system clock counter to match real-world time, and (3) disable any further RDTSC trapping for the VM until module 108 determines that time virtualization heuristics should be reactivated. The combination of steps (1) and (2) ensures that, at the time of the initial RDTSC exit/trap, the VM's system clock counter will be brought in alignment with RDTSC timestamps generated directly by the CPU hardware. Accordingly, hypervisor 102 can refrain from trapping and emulating any further RDTSC instruction calls made from within the secure hardware enclave at that point, until an event occurs that causes time virtualization heuristics for the VM to be reactivated. With this approach, the VM's guest OS will observe a sudden jump forward in system time due to the system clock counter being moved forward; however, this approach is relatively easy to implement and thus can be opportunistically employed for scenarios where it is unlikely that the RDTSC instruction will be called by guest code within a secure hardware enclave.

It should be appreciated that the architecture of host system 100 shown in FIG. 1 is illustrative and not intended to limit embodiments of the present disclosure. For instance, although FIG. 1 depicts a particular arrangement for the components of host system 100, other arrangements are possible (e.g., the functionality attributed to a particular component may be split into multiple components, components may be combined, etc.). Further, host system 100 may include other components/sub-components and/or implement other functions that are not specifically described. One of ordinary skill in the art will recognize other variations, modifications, and alternatives.

3. TSC Scaling

As indicated above, TSC scaling is a feature found on modern x86 CPU designs which allows a hypervisor (or other program code) to set, in CPU hardware, a scaling factor to be applied to all RDTSC timestamps generated by that hardware for a given context (e.g., a given VM). With the TSC scaling approach, hypervisor 102 of FIG. 1 can leverage this feature to achieve consistency between the RDTSC timestamps generated by physical CPUs 106(1)-(K) and the VM system clock interrupts/counters manipulated by time virtualization heuristics module 108. This, in turn, obviates the need for hypervisor 102 to emulate, via RDTSC emulator 112, RDTSC instruction calls originating from secure hardware enclave guest code within VMs 104(1)-(J).

Figure 2:
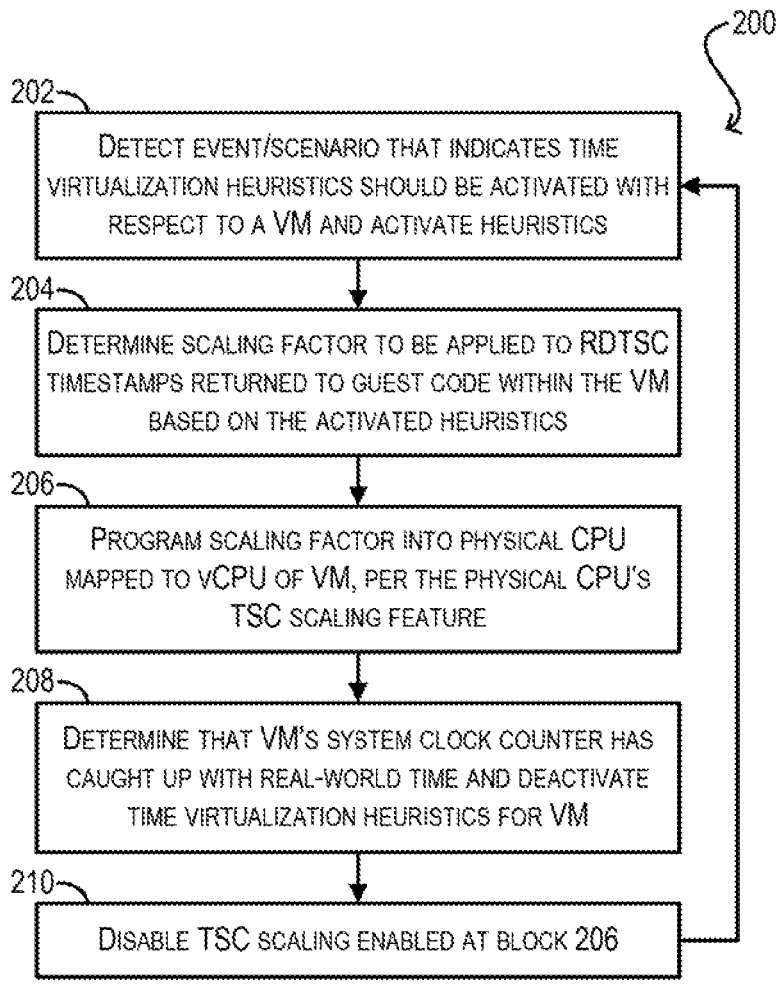
FIG. 2 depicts a first workflow for supporting RDTSC invocations via a TSC scaling approach according to certain embodiments.

FIG. 2 depicts a first workflow 200 for implementing the TSC scaling approach according to certain embodiments. In this first implementation, TSC scaling is enabled as soon as time virtualization heuristics are activated for a VM 104. Thus, there is no need to trap RDTSC instruction calls originating from the VM at all, which improves overall VM performance by eliminating the overhead associated with exits to the hypervisor.

Starting with block 202, time virtualization heuristics module 108 can detect the occurrence of an event/scenario that indicates time virtualization heuristics (e.g., accelerated interrupt delivery) should be activated with respect to a given VM 104 and can activate the heuristics accordingly. For example, module 108 may detect that VM 104 has been de-scheduled and re-scheduled on a physical CPU 106, which has caused the VM's guest OS to miss one or more system clock timer interrupts.

At block 204, upon activating the time virtualization heuristics for VM 104, module 108 can determine a scaling factor that should be applied to RDTSC timestamps returned to guest code within VM 104 (such as, e.g., guest code running within a secure hardware enclave of the VM) based on the activated heuristics. For instance, if the activated heuristics cause module 108 to accelerate the delivery of interrupts to the VM's guest OS by a factor of 2, module 108 may determine that RDTSC timestamps for the VM should be cut in half (subject to an appropriate offset). Generally speaking, the goal of the scaling factor determined at block 204 is to ensure that any hardware based RDTSC timestamps scaled using this scaling factor will reflect a VM system time that is consistent with the VM's system clock counter, per the accelerated interrupt delivery applied via module 108. Although not explicitly shown in FIG. 2, as part of block 204, time heuristics virtualization module 108 may also determine an offset to be applied to the RDTSC timestamps per conventional virtualized RDTSC implementations.

Once timer virtualization heuristics module 108 has determined the scaling factor, module 108 can invoke an appropriate CPU instruction for programming this scaling factor into the physical CPU 106 that is mapped to the vCPU of VM 104, in accordance with the physical CPU's TSC scaling feature (block 206). The result of this step is that all RDTSC timestamps generated by that physical CPU from that point onward will be scaled per the scaling factor.

Then, at some future point in time, time virtualization heuristics module 108 can determine that the system clock counter for VM 104 has caught up with real-world time, and thus can deactivate the heuristics previously activated for VM 104 at block 202 (block 208). Finally, in response to deactivating the heuristics, time virtualization heuristics module 108 can also disable the TSC scaling programmed/enabled at block 206, which will cause physical CPU 106 to generate future RDTSC timestamps for VM 104 in an unscaled fashion (block 210), and subsequently return to block 202 in order to repeat the process as needed. Note that throughout the entirety of workflow 200, time virtualization heuristics module 108 does not set the trap bit for trapping RDTSC instruction calls to hypervisor 102. Thus, any invocations of the RDTSC instruction made by guest code within VM 104 will always be handled directly by the CPU hardware of the host system, without the involvement of hypervisor 102.

Figure 3:
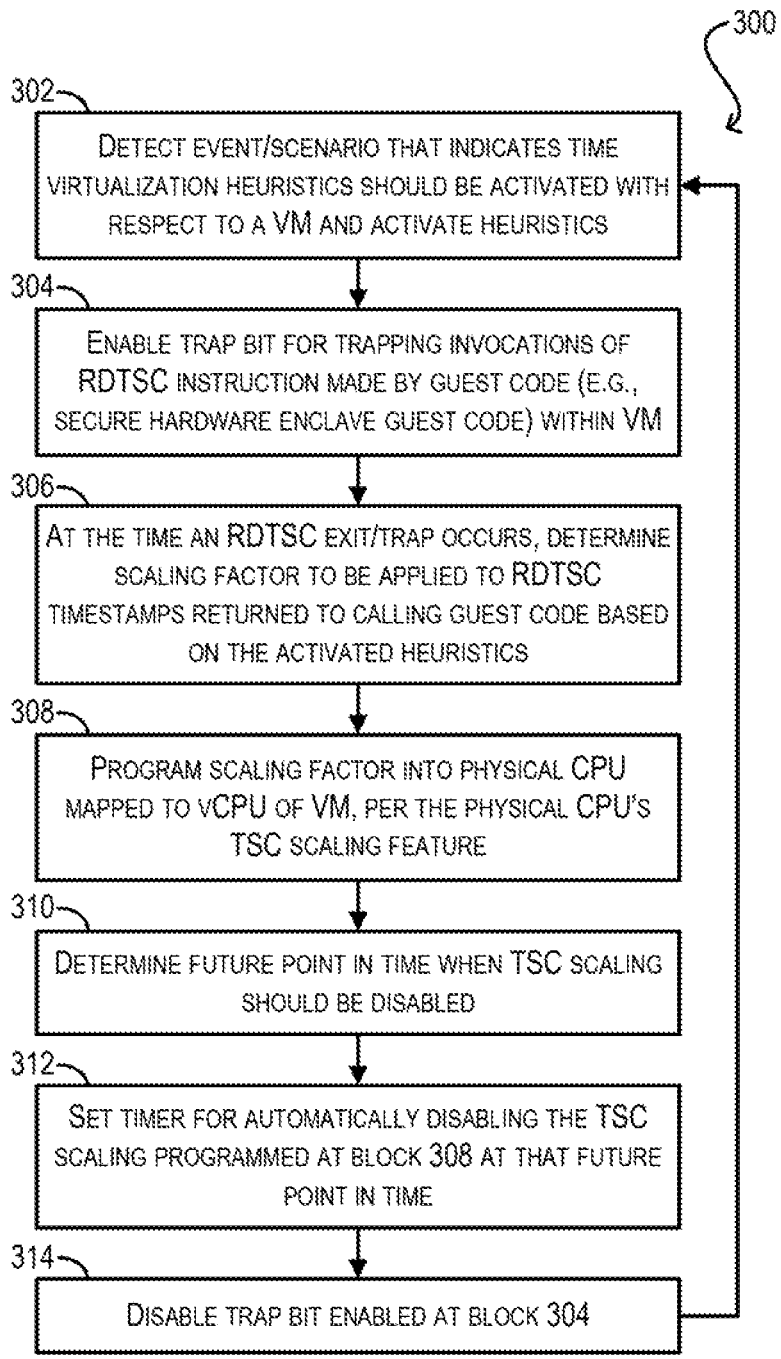
FIG. 3 depicts a second workflow for supporting RDTSC invocations via the TSC scaling approach according to certain embodiments.

FIG. 3 depicts a second workflow 300 for implementing the TSC scaling approach according to certain embodiments. In this second implementation, TSC scaling is enabled at the time an RDTSC exit/trap occurs.

Starting with block 302, time virtualization heuristics module 108 can detect the occurrence of an event/scenario that indicates time virtualization heuristics (e.g., accelerated interrupt delivery) should be activated with respect to a given VM 104 and can activate the heuristics accordingly. In addition, at block 304, time virtualization heuristics module 108 can enable a trap bit that causes all RDTSC invocations from VM 104 (such as from, e.g., guest code running within a secure hardware enclave of the VM), to be trapped by hypervisor 102.

Then, at the time an RDTSC exit/trap occurs (in other words, at the time guest code within VM 104 calls the RDTSC instruction and causes a trap/exit to hypervisor 102), RDTSC trap handler 110 can determine a scaling factor that should be applied to RDTSC timestamps returned to the calling guest code based on the activated heuristics (block 306) and can invoke an appropriate CPU instruction for programming this scaling factor into the physical CPU 106 that is mapped to the vCPU of VM 104, in accordance with the physical CPU's TSC scaling feature (block 308). These two steps are substantially similar to blocks 204 and 206 of workflow 200.

At block 310, RDTSC trap handler 110 can determine at what point in the future the TSC scaling should be disabled. In certain embodiments, this can involve communicating with time virtualization heuristics module 108 to determine when VM 104's system clock counter will be fully caught up with real-world time (or stated another way, when the activated heuristics for VM 104 can be deactivated). Upon determining this, RDTSC trap handler 110 can set a timer (as, e.g., a background process/thread within hypervisor 102) for automatically disabling the TSC scaling at that point in time (block 312).

Finally, at block 314, RDTSC trap handler 110 can disable the trap bit for VM 104 previously set at block 304 and workflow 300 can return to block 302 in order to repeat the process as needed.

It should be appreciated that workflows 200 and 300 of FIGS. 2 and 3 are illustrative and various modifications are possible. For example, in some embodiments, time virtualization heuristics module may dynamically change the rate at which it delivers interrupts to a given VM while heuristics for the VM are active. This may be desirable if, for example, the VM is de-scheduled again during that time period, in which case module 108 may want to increase the rate at which interrupts are delivered in order to prevent the VM's system clock counter from falling further behind. In these embodiments, rather that determining and programming a single scaling factor for the VM, time heuristics virtualization module 108 may periodically adjust and re-program this scaling factor to account for any changes in the interrupt delivery rate made by the module.

4. Heuristics Suppression

Figure 4:
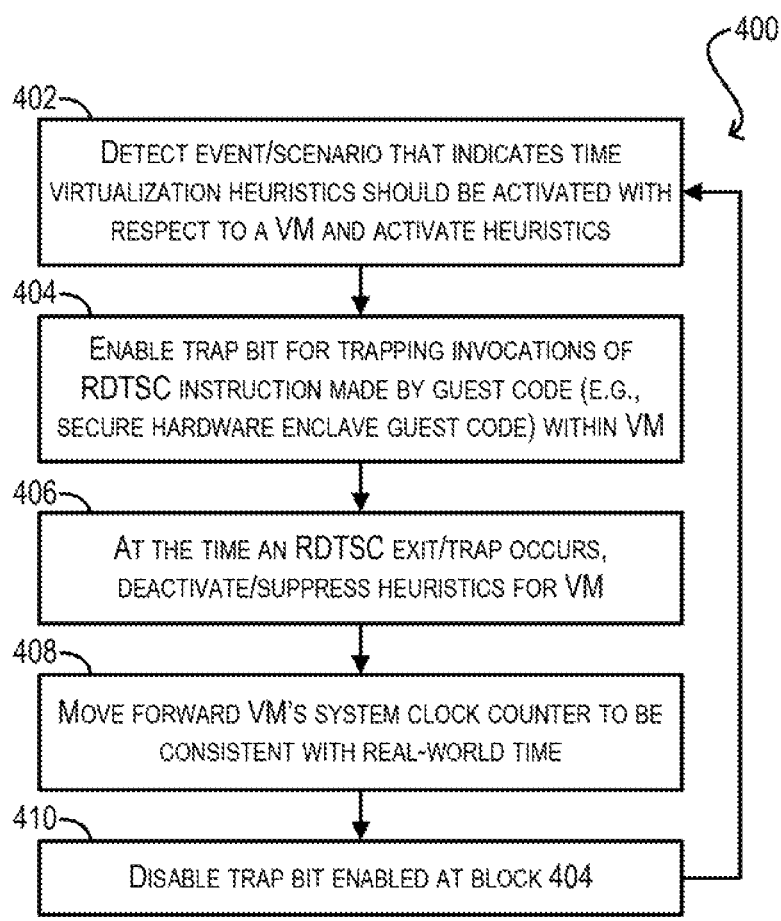
FIG. 4 depicts a workflow for supporting RDTSC invocations via a heuristics suppression approach according to certain embodiments.

FIG. 4 depicts a workflow 400 for implementing the heuristics suppression approach noted in section (2) according to certain embodiments. With this approach, the heuristics activated for a VM by module 108 are suppressed at a time an RDTSC exit/trap is taken and the VM's system clock counter is set forward to match real-world time, thereby ensuring that hardware generated RDTSC timestamps are consistent with the system clock counter. In addition, any system clock timer interrupts that were not delivered to the VM due, e.g., the VM being de-scheduled are effectively dropped (i.e., they are skipped over and never delivered).

Starting with block 402, time virtualization heuristics module 108 can detect the occurrence of an event/scenario that indicates time virtualization heuristics (e.g., accelerated interrupt delivery) should be activated with respect to a given VM 104 and can activate the heuristics accordingly. In addition, at block 404, time virtualization heuristics module 108 can enable a trap bit that causes all RDTSC invocations from VM 104 (such as from, e.g., guest code running within a secure hardware enclave of the VM), to be trapped by hypervisor 102.

Then, at the time an RDTSC exit/trap occurs (in other words, at the time guest code within VM 104 calls the RDTSC instruction and causes a trap/exit to hypervisor 102), RDTSC trap handler 110 can instruct time virtualization heuristics module 108 to discard its internal state with respect to VM 104, thereby deactivating/suppressing the heuristics for the VM (block 406). This means that module 108 will no longer attempt to deliver to VM 104 the system clock timer interrupts that the VM had missed while in an inactive/de-scheduled state. RDTSC trap handler 110 can further move forward VM 104's system clock counter to match real-world time (block 408). For example, if the VM's system clock counter is currently set to 5 (i.e., 50 ms, assuming 10 ms per interrupt) but the real-world elapsed time from the point of VM power-on is 90 ms, RDTSC trap handler 110 can move forward the system clock counter to 9. In a particular embodiment, this can be achieved by issuing a remote procedure call (RPC) to an agent running within VM 104 for a forward clock correction. Upon being invoked, the agent can adjust the VM's system clock counter accordingly.

Finally, at block 410, RDTSC trap handler 110 can disable the trap bit for VM 104 previously set at block 404 and workflow 400 can return to block 402 in order to repeat the process as needed.

Certain embodiments described herein involve a hardware abstraction layer on top of a host system (i.e., computer). The hardware abstraction layer allows multiple containers to share the hardware resource. These containers, isolated from each other, have at least a user application running therein. The hardware abstraction layer thus provides benefits of resource isolation and allocation among the containers. In the foregoing embodiments, virtual machines (VMs) are used as an example for the containers and hypervisors as an example for the hardware abstraction layer. As described above, each virtual machine includes a guest operating system in which at least one application runs. It should be noted that these embodiments may also apply to other examples of containers, such as containers not including a guest operating system, referred to herein as "OS-less containers" (see, e.g., www.docker.com). OS-less containers implement operating system-level virtualization, wherein an abstraction layer is provided on top of the kernel of an operating system on a host computer. The abstraction layer supports multiple OS-less containers each including an application and its dependencies. Each OS-less container runs as an isolated process in userspace on the host operating system and shares the kernel with other containers. The OS-less container relies on the kernel's functionality to make use of resource isolation (CPU, memory, block I/O, network, etc.) and separate namespaces and to completely isolate the application's view of the operating environments. By using OS-less containers, resources can be isolated, services restricted, and processes provisioned to have a private view of the operating system with their own process ID space, file system structure, and network interfaces. Multiple containers can share the same kernel, but each container can be constrained to only use a defined amount of resources such as CPU, memory and I/O.

Further embodiments described herein can employ various computer-implemented operations involving data stored in computer systems. For example, these operations can require physical manipulation of physical quantities—usually, though not necessarily, these quantities take the form of electrical or magnetic signals, where they (or representations of them) are capable of being stored, transferred, combined, compared, or otherwise manipulated. Such manipulations are often referred to in terms such as producing, identifying, determining, comparing, etc. Any operations described herein that form part of one or more embodiments can be useful machine operations.

Yet further, one or more embodiments can relate to a device or an apparatus for performing the foregoing operations. The apparatus can be specially constructed for specific required purposes, or it can be a general-purpose computer system selectively activated or configured by program code stored in the computer system. In particular, various general-purpose machines may be used with computer programs written in accordance with the teachings herein, or it may be more convenient to construct a more specialized apparatus to perform the required operations. The various embodiments described herein can be practiced with other computer system configurations including handheld devices, microprocessor systems, microprocessor-based or programmable consumer electronics, minicomputers, mainframe computers, and the like.

Yet further, one or more embodiments can be implemented as one or more computer programs or as one or more computer program modules embodied in one or more non-transitory computer readable storage media. The term non-transitory computer readable storage medium refers to any data storage device that can store data which can thereafter be input to a computer system. The non-transitory computer readable media may be based on any existing or subsequently developed technology for embodying computer programs in a manner that enables them to be read by a computer system. Examples of non-transitory computer readable media include a hard drive, network attached storage (NAS), read-only memory, random-access memory, flash-based nonvolatile memory (e.g., a flash memory card or a solid state disk), a CD (Compact Disc) (e.g., CD-ROM, CD-R, CD-RW, etc.), a DVD (Digital Versatile Disc), a magnetic tape, and other optical and non-optical data storage devices. The non-transitory computer readable media can also be distributed over a network coupled computer system so that the computer readable code is stored and executed in a distributed fashion.

In addition, while described virtualization methods have generally assumed that virtual machines present interfaces consistent with a particular hardware system, persons of ordinary skill in the art will recognize that the methods described can be used in conjunction with virtualizations that do not correspond directly to any particular hardware system. Virtualization systems in accordance with the various embodiments, implemented as hosted embodiments, non-hosted embodiments or as embodiments that tend to blur distinctions between the two, are all envisioned. Furthermore, certain virtualization operations can be wholly or partially implemented in hardware.

Many variations, modifications, additions, and improvements are possible, regardless the degree of virtualization. The virtualization software can therefore include components of a host, console, or guest operating system that performs virtualization functions. Plural instances can be provided for components, operations, or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations can be implemented as a combined structure or component. Similarly, structures and functionality presented as a single component can be implemented as separate components.

As used in the description herein and throughout the claims that follow, "a," "an," and "the" includes plural references unless the context clearly dictates otherwise. Also, as used in the description herein and throughout the claims that follow, the meaning of "in" includes "in" and "on" unless the context clearly dictates otherwise.

The above description illustrates various embodiments along with examples of how aspects of particular embodiments may be implemented. These examples and embodiments should not be deemed to be the only embodiments and are presented to illustrate the flexibility and advantages of particular embodiments as defined by the following claims. Other arrangements, embodiments, implementations and equivalents can be employed without departing from the scope hereof as defined by the claims.

What is claimed is:

1. A method comprising:
   activating, by a hypervisor of a host system, time virtualization heuristics for a virtual machine (VM), the time virtualization heuristics causing accelerated delivery of system clock timer interrupts by the hypervisor to a guest operating system (OS) of the VM;
   upon activating the time virtualization heuristics, determining, by the hypervisor, a scaling factor to be applied to RDTSC (Read Time-Stamp Counter) timestamps generated by one or more physical central processing units (CPUs) of the host system, wherein the RDTSC timestamps are generated in response to invocations of an RDTSC CPU instruction made by guest program code running within the VM, wherein the scaling factor is based on the activated time virtualization heuristics, and wherein when the scaling factor is applied to the RDTSC timestamps generated by the one or more physical CPUs, the RDTSC timestamps are consistent with a system clock counter of the VM while the time virtualization heuristics are activated, the system clock counter indicating a system time of the VM and being based on the system clock timer interrupts delivered by the hypervisor; and
   programming, by the hypervisor, the scaling factor into the one or more physical CPUs, the programming causing the one or more physical CPUs to apply the scaling factor to the generated RDTSC timestamps.

2. The method of claim 1 further comprising:
   determining that the system clock counter of the VM has caught up with real-world time due to the time virtualization heuristics; and
   in response to determining that the system clock counter has caught up with real-world time, reversing the programming of the scaling factor.

3. The method of claim 1 wherein the guest program code comprises code running within a secure hardware enclave of the VM.

4. The method of claim 1 wherein the scaling factor is programmed via a TSC (Time-Stamp Counter) scaling feature supported by the one or more physical CPUs.

5. The method of claim 1 wherein the scaling factor is determined after an invocation of the RDTSC CPU instruction has been trapped by the hypervisor.

6. The method of claim 5 further comprising:
   prior to determining the scaling factor, enabling a trap bit for trapping the invocations of the RDTSC CPU instruction by the hypervisor; and
   at a time when the time virtualization heuristics for the VM are deactivated, disabling the trap bit.

7. A non-transitory computer readable storage medium having stored thereon program code executable by a hypervisor of a host system, the program code embodying a method comprising:
   activating time virtualization heuristics for a virtual machine (VM), the time virtualization heuristics causing accelerated delivery of system clock timer interrupts by the hypervisor to a guest operating system (OS) of the VM;
   upon activating the time virtualization heuristics, determining a scaling factor to be applied to RDTSC (Read Time-Stamp Counter) timestamps generated by one or more physical central processing units (CPUs) of the host system, wherein the RDTSC timestamps are generated in response to invocations of an RDTSC CPU instruction made by guest program code running within the VM, wherein the scaling factor is based on the activated time virtualization heuristics, and wherein when the scaling factor is applied to the RDTSC timestamps generated by the one or more physical CPUs, the RDTSC timestamps are consistent with a system clock counter of the VM while the time virtualization heuristics are activated, the system clock counter indicating a system time of the VM and being based on the system clock timer interrupts delivered by the hypervisor; and
   programming the scaling factor into the one or more physical CPUs, the programming causing the one or more physical CPUs to apply the scaling factor to the generated RDTSC timestamps.

8. The non-transitory computer readable storage medium of claim 7 wherein the method further comprises:
   determining that the system clock counter of the VM has caught up with real-world time due to the time virtualization heuristics; and in response to determining that the system clock counter has caught up with real-world time, reversing the programming of the scaling factor.

9. The non-transitory computer readable storage medium of claim 7 wherein the guest program code comprises code running within a secure hardware enclave of the VM.

10. The non-transitory computer readable storage medium of claim 7 wherein the scaling factor is programmed via a TSC (Time-Stamp Counter) scaling feature supported by the one or more physical CPUs.

11. The non-transitory computer readable storage medium of claim 7 wherein the scaling factor is determined after an invocation of the RDTSC CPU instruction has been trapped by the hypervisor.

12. The non-transitory computer readable storage medium of claim 11 wherein the method further comprises:
   prior to determining the scaling factor, enabling a trap bit for trapping the invocations of the RDTSC CPU instruction by the hypervisor; and
   at a time when the time virtualization heuristics for the VM are deactivated, disabling the trap bit.

13. A host system comprising:
   one or more physical central processing units (CPUs);
   a hypervisor; and
   a non-transitory computer readable medium having stored thereon program code that, when executed, causes the hypervisor to:
      activate time virtualization heuristics for a virtual machine (VM), the time virtualization heuristics causing accelerated delivery of system clock timer interrupts by the hypervisor to a guest operating system (OS) of the VM;
      upon activating the time virtualization heuristics, determine a scaling factor to be applied to RDTSC (Read Time-Stamp Counter) timestamps generated by the one or more physical CPUs, wherein the RDTSC timestamps are generated in response to invocations of an RDTSC CPU instruction made by guest program code running within the VM, wherein the scaling factor is based on the activated time virtualization heuristics, and wherein when the scaling factor is applied to the RDTSC timestamps generated by the one or more physical CPUs, the RDTSC timestamps are consistent with a system clock counter of the VM while the time virtualization heuristics are activated, the system clock counter indicating a system time of the VM and being based on the system clock timer interrupts delivered by the hypervisor; and
      program the scaling factor into the one or more physical CPUs, the programming causing the one or more physical CPUs to apply the scaling factor to the generated RDTSC timestamps.

14. The host system of claim 13 wherein the program code further causes the hypervisor to:
   determine that the system clock counter of the VM has caught up with real- world time due to the time virtualization heuristics; and
   in response to determining that the system clock counter has caught up with real- world time, reverse the programming of the scaling factor.

15. The host system of claim 13 wherein the guest program code comprises code running within a secure hardware enclave of the VM.

16. The host system of claim 13 wherein the scaling factor is programmed via a TSC (Time-Stamp Counter) scaling feature supported by the one or more physical CPUs.

17. The host system of claim 13 wherein the scaling factor is determined after an invocation of the RDTSC CPU instruction has been trapped by the hypervisor.

18. The host system of claim 17 wherein the program code further causes the hypervisor to:
   prior to determining the scaling factor, enable a trap bit for trapping the invocations of the RDTSC CPU instruction by the hypervisor; and
   at a time when the time virtualization heuristics for the VM are deactivated, disable the trap bit.

\* \* \* \* \*